United States Patent [19]

Beasley

[11] Patent Number: 5,377,255
[45] Date of Patent: Dec. 27, 1994

[54] RF REPEATERS FOR TIME DIVISION DUPLEX CORDLESS TELEPHONE SYSTEMS

[75] Inventor: Andrew Beasley, Lake Errock, Canada

[73] Assignee: PCS Microcell International Inc., Bridgetown, Barbados

[21] Appl. No.: 913,025

[22] Filed: Jul. 14, 1992

[51] Int. Cl.$^5$ .................. H04M 11/00; H04M 15/00; H04B 3/36; H04B 7/15
[52] U.S. Cl. ................................ 379/58; 379/56; 379/59; 379/61; 379/121; 455/8; 455/9; 455/17; 455/18; 370/7; 370/97
[58] Field of Search .................. 379/58, 61, 121, 56, 379/59; 455/8, 9, 17, 18, 72; 370/7, 97

[56] References Cited

U.S. PATENT DOCUMENTS

| | | | |
|---|---|---|---|
| 3,628,147 | 12/1971 | Makino | 325/4 |
| 4,234,959 | 11/1980 | Andrea, III et al. | |
| 4,284,848 | 8/1981 | Frost | 379/121 |
| 4,347,625 | 8/1982 | Williams | 455/17 |
| 4,596,042 | 6/1986 | Stangl | |
| 4,644,105 | 2/1987 | Cameron | 379/56 |
| 4,752,949 | 6/1988 | Steinbeck et al. | 379/61 |
| 4,941,200 | 7/1990 | Leslie et al. | 455/17 |
| 5,115,463 | 5/1992 | Moldavsky et al. | 379/58 |
| 5,129,096 | 7/1992 | Burns | 455/18 |
| 5,133,001 | 7/1992 | Böhm | 379/58 |
| 5,168,574 | 12/1992 | Gordon et al. | 455/9 |
| 5,200,955 | 4/1993 | McFarlane et al. | 370/97 |
| 5,249,174 | 9/1993 | Itoh | 370/7 |
| 5,267,297 | 11/1993 | Kawano et al. | 379/59 |
| 5,278,989 | 1/1994 | Burke et al. | 455/8 |

FOREIGN PATENT DOCUMENTS

| | | |
|---|---|---|
| 0112409 | 7/1984 | European Pat. Off. |
| 0240051 | 10/1987 | European Pat. Off. |
| 0421602 | 4/1991 | European Pat. Off. |
| 2482339 | 11/1981 | France |
| 2114309 | 2/1985 | United Kingdom |

OTHER PUBLICATIONS

Mazda, "Electronics Engineer's Reference Book" 5th Edition 1983, pp. 56/10–17.
"Electronics Engineers' Handbook", Second Edition, McGraw-Hill, 1982 pp. 22-16 and 22-17.
"Microcells in Personal Communication Systems", Greenstein, et al., IEEE Communications Magazine, Dec. 1992, vol. 30, No. 12, pp. 76–88.

Primary Examiner—Curtis Kuntz
Assistant Examiner—William Cumming
Attorney, Agent, or Firm—Brian M. Long

[57] ABSTRACT

An RF repeater for interfacing with a base station for exchanging transmit and receive signals in a time division duplex cordless telephone system comprises a multicarrier amplifier having an input and an output and a transfer switch connected to the amplifier output and the amplifier input and having first and second switch states. The switch means connects receive signals from the handset to the amplifier input and the amplifier output to the base station in the first switch state, and connects the base station to the amplifier input and transmit signals from the amplifier output to be broadcast to the handset in the second switch state. The operation of the switch is controlled so that the transmit and receive signals are alternately amplified by the amplifier. Thus, only a single amplifier is required.

2 Claims, 11 Drawing Sheets

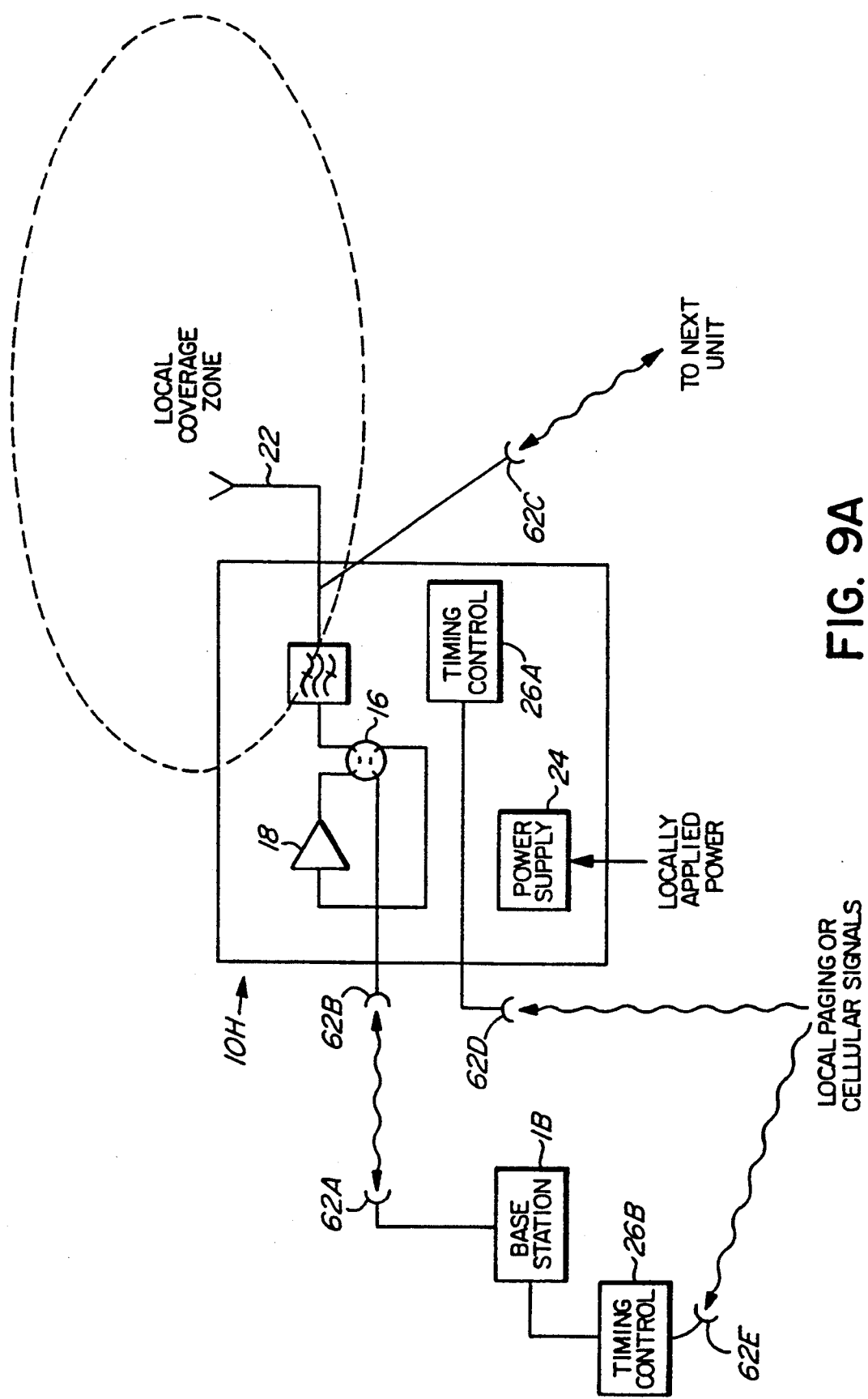

RF REPEATERS FOR TIME DIVISION DUPLEX CORDLESS TELEPHONE SYSTEMS

BACKGROUND OF THE INVENTION

1. Field of the Invention

The present invention relates to RF repeaters for use in cordless telephone systems and, more particularly, for interfacing between cordless handsets and base stations by exchanging downstream transmit signals from a base station and upstream receive signals from cordless handsets using time division duplex transmissions.

The present RF repeater is useful in particular in telephone systems employing cable television plant as a signal conduit but may also be employed in cordless telephone systems utilizing dedicated coaxial cable and/or fiber optic and/or microwave signal conduits.

2. Description of the Related Art

It is expected that Personal Communication Services (PCS) microcells will be supporting a rapidly increasing number of handsets in North America in the near future. To support this user base it is essential that the PCS microcells be both low power (to assist frequency re-use) and low cost (because the net capital costs of the PCS microcells will be a major factor in the economic viability of PCS).

What has been suggested by a number of organisations is that existing cable television distribution plant be used to interconnect microcell equipment. Taking advantage of the broadband and the nearly ubiquitous nature of cable plant, it has been further proposed that the microcell equipment consist of simple RF repeaters that translate off-air mobile voice traffic onto the cable plant and vice versa.

This approach uses the cable plant as a RF combining/splitting network since it preserves the basic RF amplitude and phase/frequency information. What has become apparent in tests is that this approach to PCS microcells yields both low capital costs and improved user service.

In summary, the low cost arises from the combination of simple technology (an RF repeater), using an existing asset base (i.e. cable plant) in a fashion that allows modulation/demodulation and PSTN interface equipment to be centrally located. This allows these equipment costs to be amortised over a very large net coverage area.

The improved service arises from better call blocking probability associated with the ability to centralise the base station equipment rather than a priori allocation to specific microcells. Additionally, the cable plant can act to form distributed antenna arrays that can be shaped into "roamer corridors". Within these roamer corridors it is also possible to control the off-air dynamic range so as to reduce near user/far user interactions and like of sight blocking.

FIG. 1 illustrates the principal hardware elements and concepts of a prior art cordless telephone system employing base stations.

Base stations 1 operate at the off-air frequencies and perform demodulation and modulation functions for the telephone signals. The base stations 1 interface directly to twisted pair telecom lines.

The base stations 1 can be mounted to interface directly with nearby handsets (not shown), or can be located at a central site, as shown, where their ability to handle calls can be amortised over a larger network of microcells connected by TV cable plant, as mentioned above.

Remote antenna signal processors (RASPs) 2 are located at the central site and interface the base stations to cable plant 4.

Typically, signals from the base stations 1 travel over the cable plant to the handset in the 200–450 MHz band. Signals travelling in the reverse direction use the 5–30 MHz return band on the cable plant.

Bi-directional distribution amplifiers 6 need to be compatible with the cable plant 4 and provide return band capability.

Remote antenna drivers (RADs) 8 must be compatible with existing TV cable plant and they may be configured for either coax or fiber plant.

RADs 8 pick-up the off-air signal and relay it back to a central site via the plant's return path, and also broadcast PCS signals on the cable downstream path (200–450 MHz) to nearby handsets, after suitable heterodyne operations.

This prior art RAD - RASP design suffers a number of limitations, which comprise, specifically:

The need to operate where there is cable television plant. Cable TV is readily available for residential markets, but less available or not at all available in public and business markets.

The need for compatibility with existing cable TV services. This requires the RAD - RASP units to use expensive heterodyne processing to interface time division duplex off-air signals to the frequency division duplex cable TV plant.

The RAD - RASP arrangement is inappropriate in some markets, e.g. those served by existing cordless base stations and those with predominately buried cable plant.

Furthermore, with such a system, the voice quality within a distributed antenna can suffer some degradation from the differences in phase noise of its constituent parts and from the differences in time delay of its constituent parts.

In some circumstances, therefore, it is preferable to use RF repeaters, transferring signals exclusively by a time division duplex protocol, instead of RADs, which employ frequency division duplexing.

Prior art RF repeaters have required two amplifiers, for amplifying the downstream transmit signals and the upstream receive signals, respectively, in each RF repeater.

BRIEF SUMMARY OF THE INVENTION

It is an object of the present invention to provide a novel and improved RF repeater for use in cordless telephone systems, which avoids the need for separate amplifiers for amplifying the transmit and receive signals.

According to the present invention, an RF repeater for interfacing with a base station for exchanging transmit and receive signals in a time division duplex cordless telephone system comprises first signal exchange means for exchanging the transmit and receive signals with the base station, second signal exchange means for exchanging the transmit and receive signals with a cordless handset, a multicarrier amplifier having an input and an output, and switch means connected to said amplifier output, said amplifier input and said first and second signal exchange means and having first and second switch states. The switch means connects the second signal exchange means to the amplifier input and the amplifier output to the first signal exchange means in the first switch state and connects the first signal exchange means to the amplifier input and the amplifier output to the second signal exchange means in the second switch state. Also, means are provided for controlling the operation of the switch means so that the transmit and receive signals are alternately amplified by the amplifier.

The present RF repeater further includes a signal detector responsive to the receive signal passing through the amplifier and controlling the switch means so as to squelch the receive signal when the receive signal power is below a predetermined value. The signal detector comprises means for comparing the receiving signal and noise from a known noise source to provide a comparison signal for controlling the switch means.

In a preferred embodiment of the invention, a diode detector compares the receive signal and noise from a known noise source to provide an AC waveform, which is then amplified and compared with a reference value by means of a comparator which, when the receive signal power is below a predetermined level, operates the switch means to squelch the receive signal passed to the base station.

The RF repeater according to the present invention has a number of advantages.

Firstly, the number of amplifier elements required in the RF repeater are reduced, and the overall cost and size of the RF repeater are correspondingly reduced.

In addition, the present invention affords excellent power efficiency since the amplifier is always in use, while the repeater arrangement is in operation, whereas in the prior art RF repeaters, using separate transmit and receive amplifiers, the amplifiers are used only periodically, and for the rest of the time they consume power and dissipate heat without providing any benefit.

A further advantage of the present invention is that it can be readily configured as an inline RF repeaters, i.e. it may be connected with other similar RF repeaters to increase the size of the coverage zone serviced by the respective base station. Also, the voice quality in any distributed antenna array provided by the RF repeaters need not suffer from degradation due to differential phase noise or differential time delay.

Figure 1:
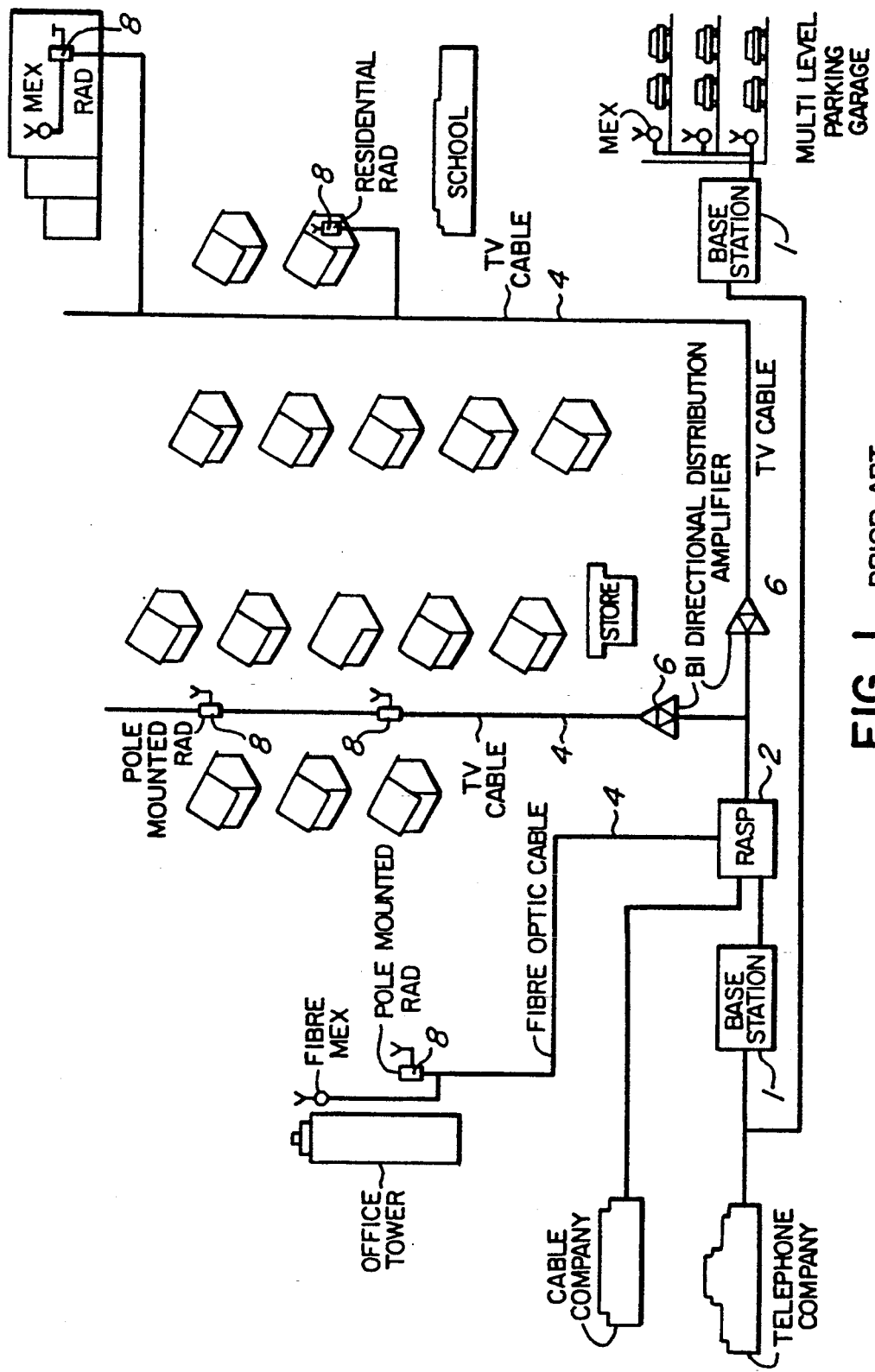
FIG. 1 illustrates the principal hardware elements of the prior art.
Figure 2:
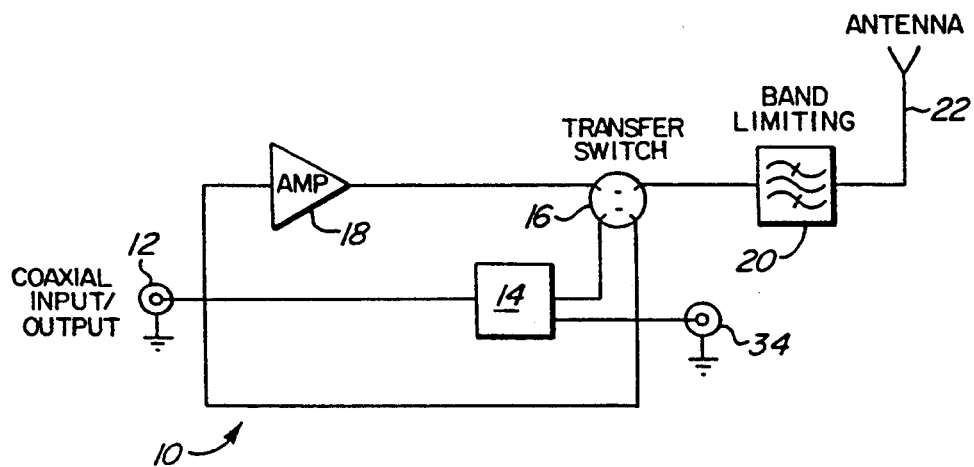
Figure 3:
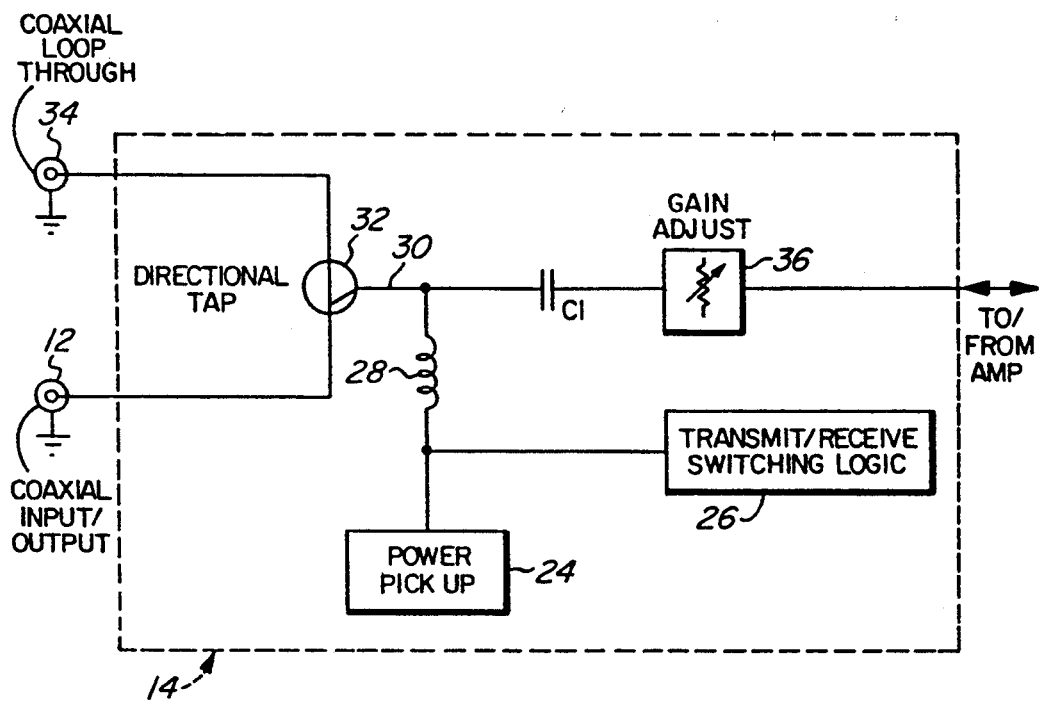
Figure 4:
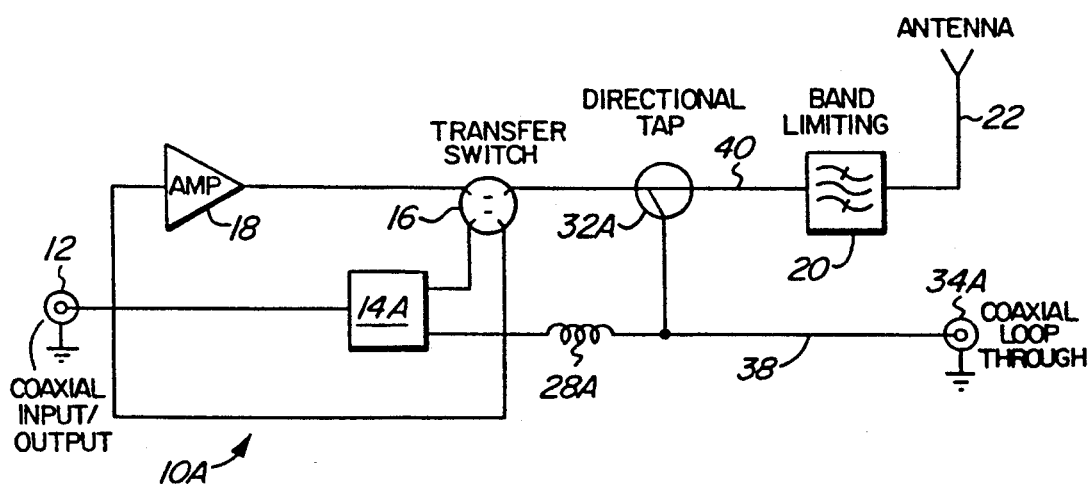
Figure 5:
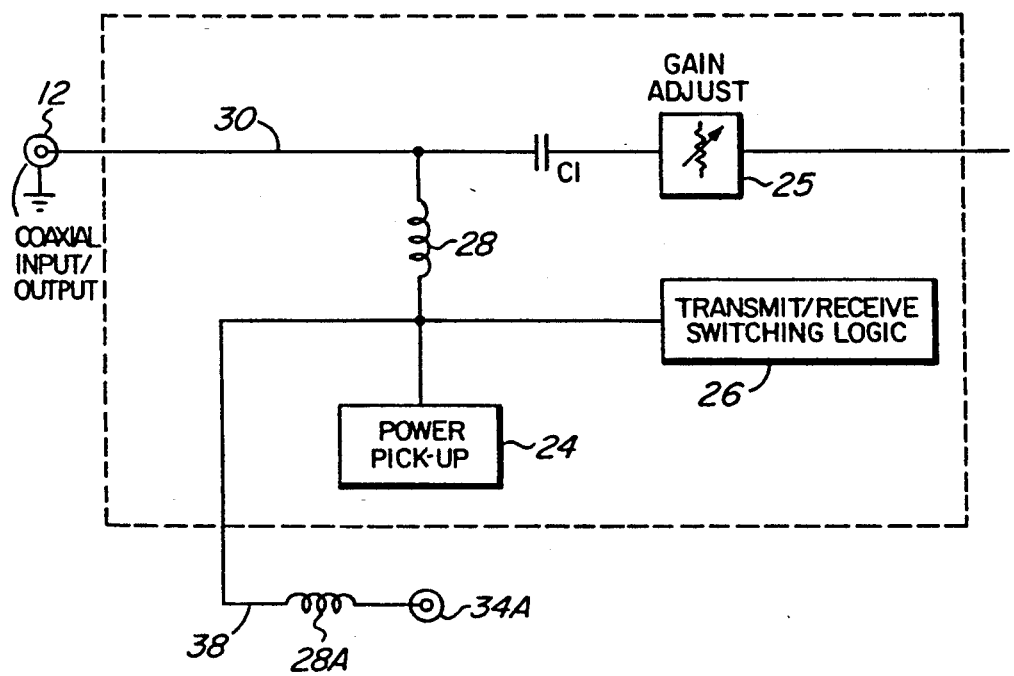
Figure 6:
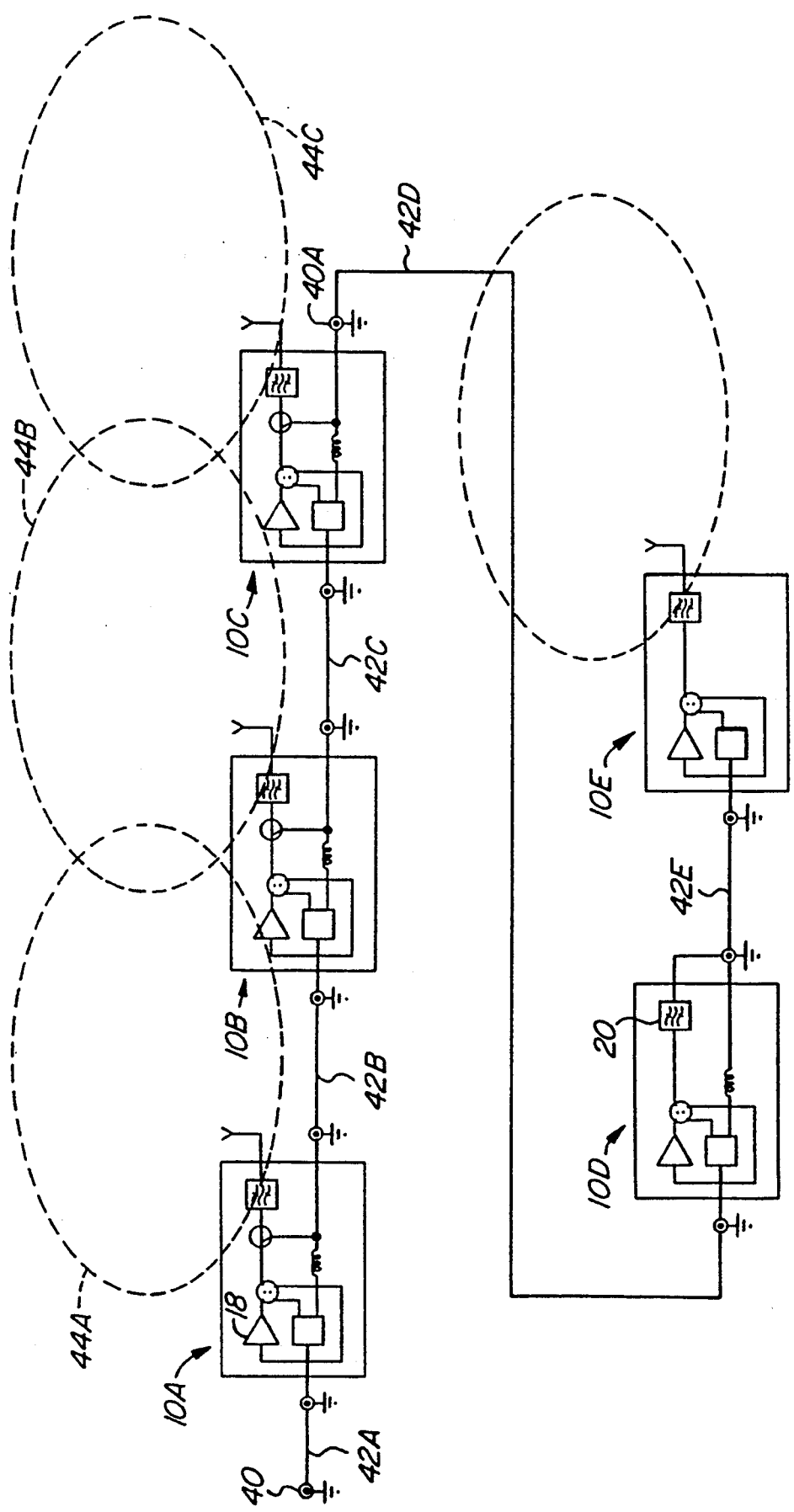
Figure 7:
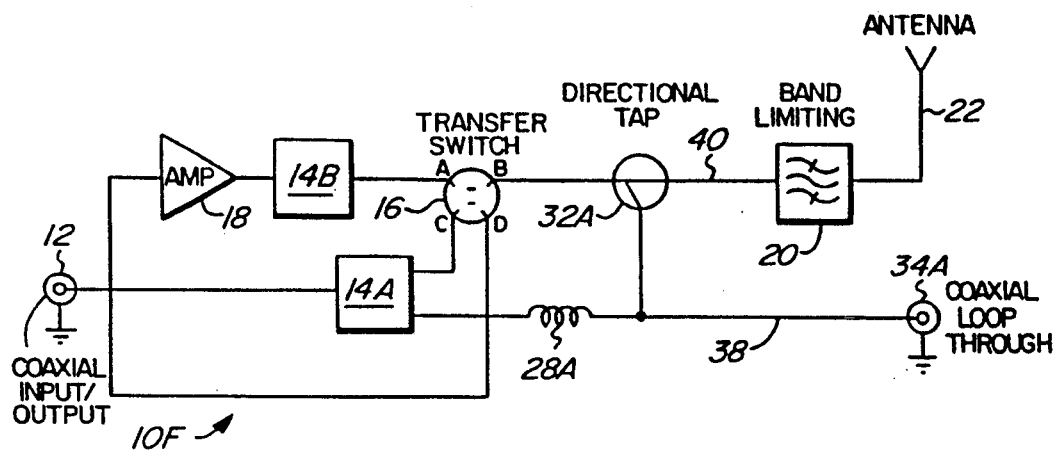
Figure 7A:
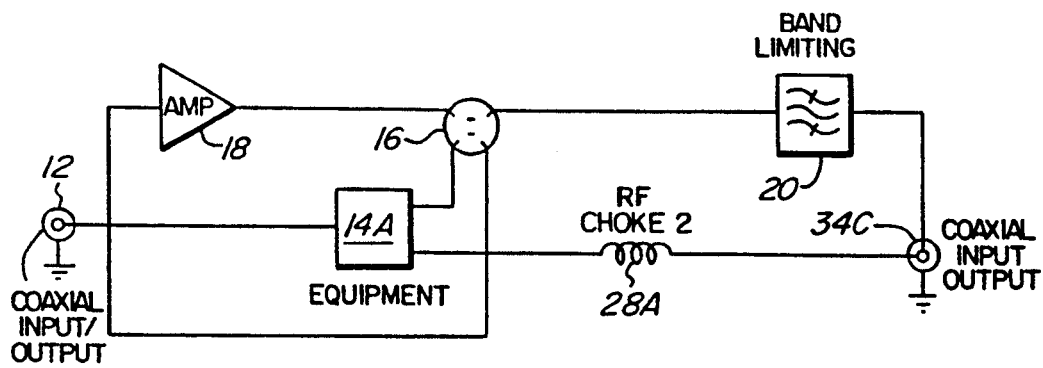
Figure 8:
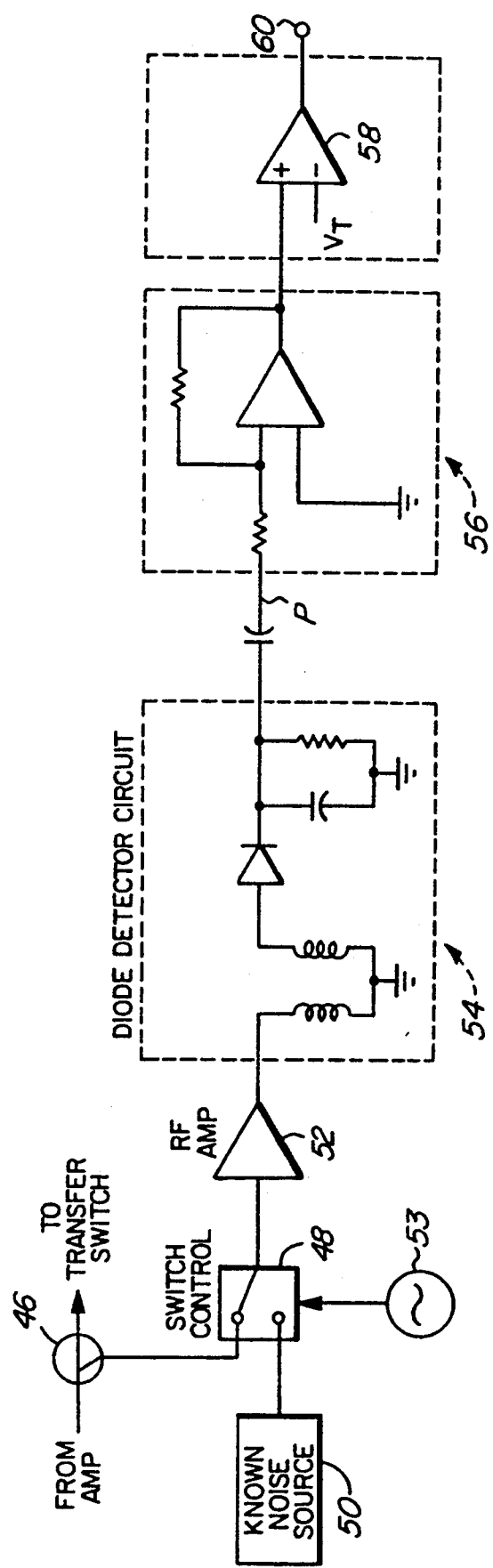
Figure 8B:
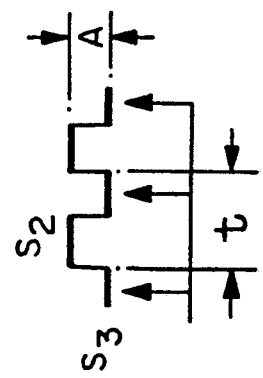
Figure 8A:
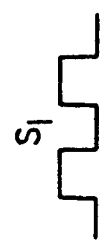
Figure 9:
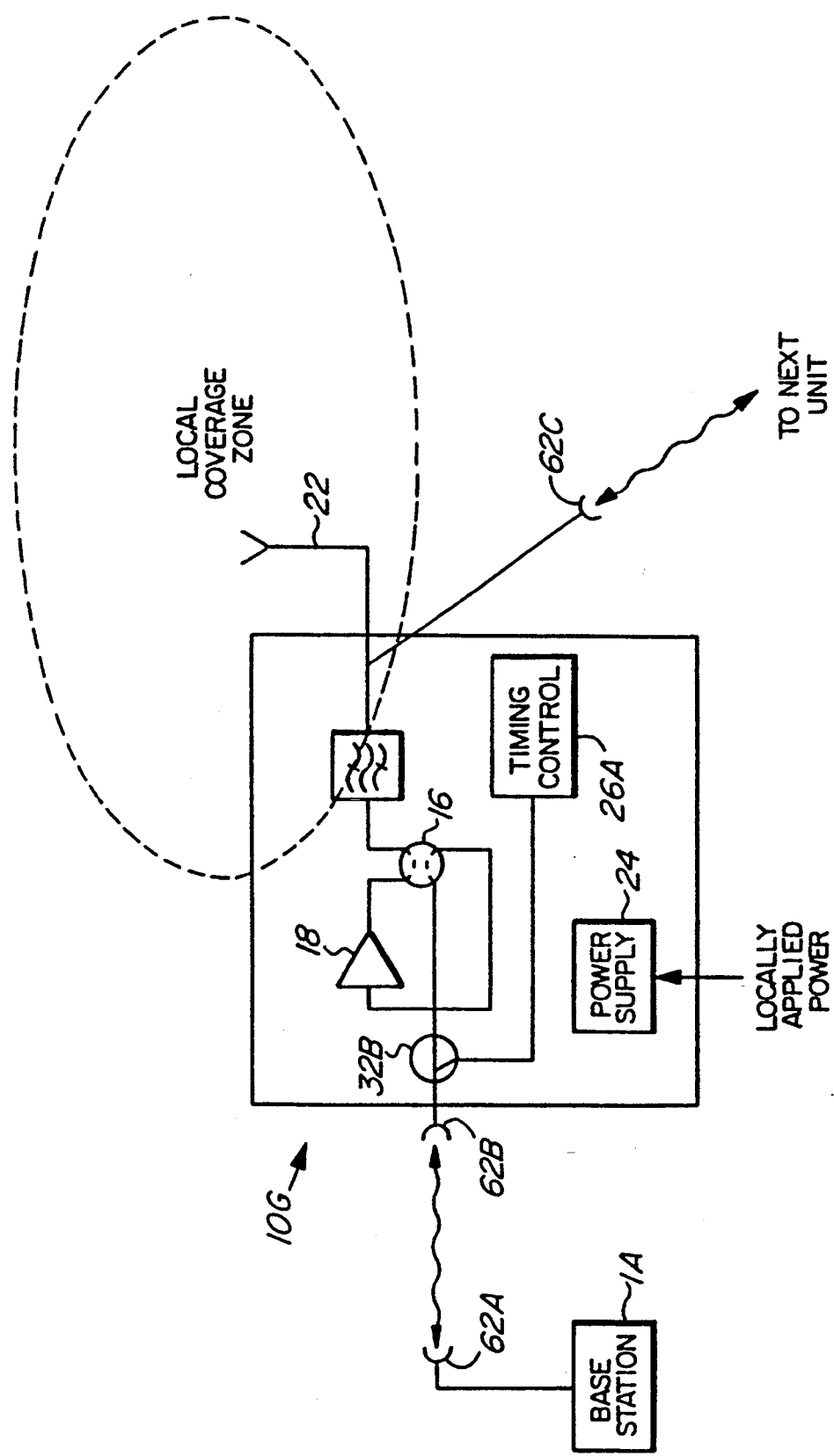
Figure 10:
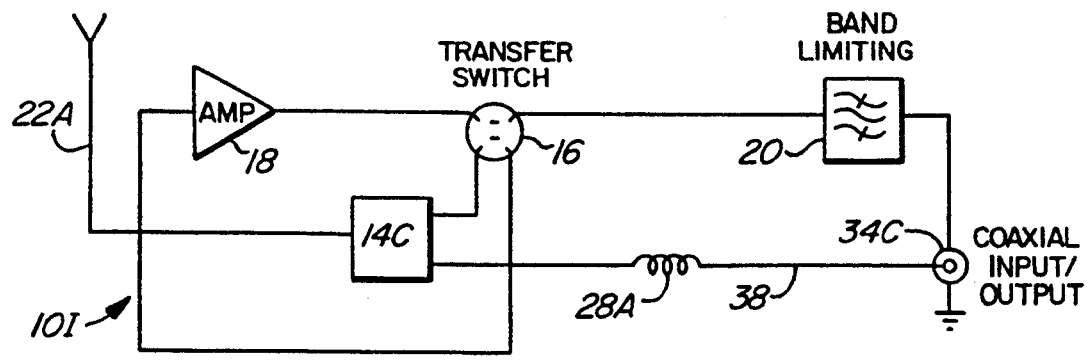
Figure 11:
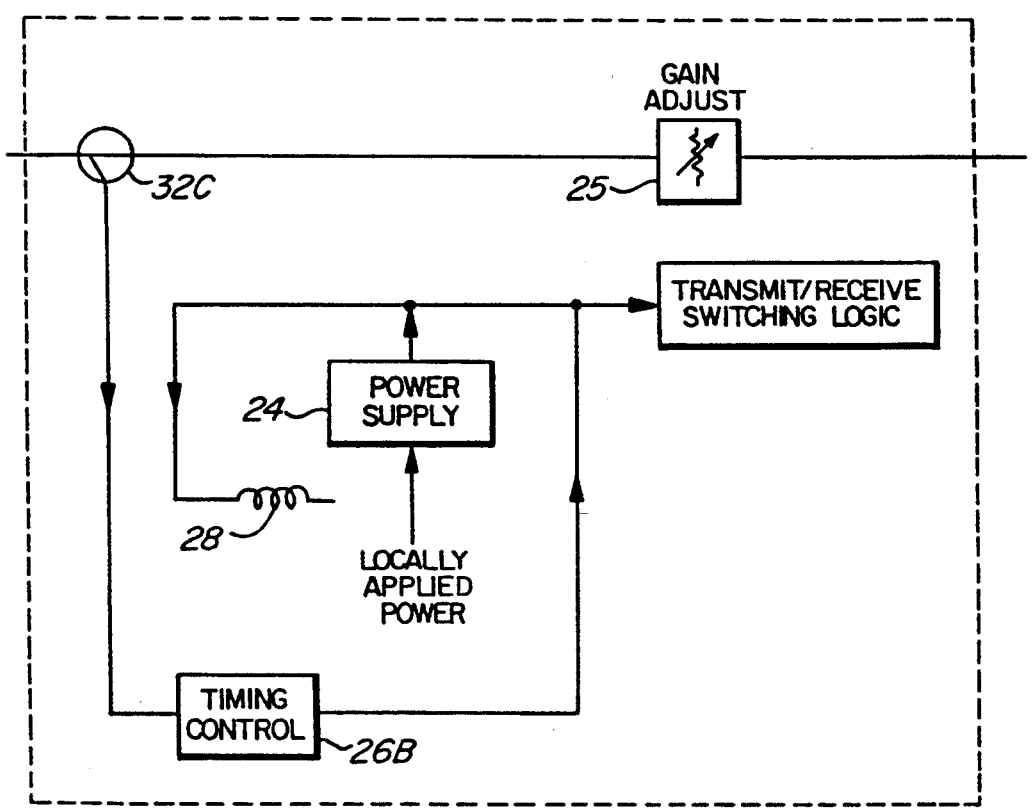

Further features, advantages and objects of the present invention will be more readily apparent from the following description thereof when taken in conjunction with FIGS. 2 through 10 of the accompanying drawings, in which:

FIG. 2 shows a block diagram of an RF repeater according to a first embodiment of the present invention;

FIG. 3 shows a block diagram illustrating in greater detail a part of the RF repeater of FIG. 2;

FIG. 4 shows a block diagram of an RF repeater according to a second embodiment of the present invention;

FIG. 5 shows a block diagram of a part of the RF repeater of FIG. 4;

FIG. 6 shows an arrangement of three of the RF repeaters, similar to that of FIG. 4, connected in cascade by intermediate coaxial cables;

FIGS. 7 and 7A show block diagrams of two modifications of the RF repeater of FIG. 4;

FIG. 8 shows a circuit diagram of part of the RF repeater of FIG. 7;

FIGS. 8A and 8B show wave forms of signals in the circuit of FIG. 8;

FIG. 9 and 9A show modifications of the RF repeater of FIG. 2 for use as on-channel repeaters;

FIG. 10 shows a block diagram of a further modified RF repeater;

FIG. 11 shows a block diagram of a component of the RF repeater of FIG. 10; and

Figure 12:
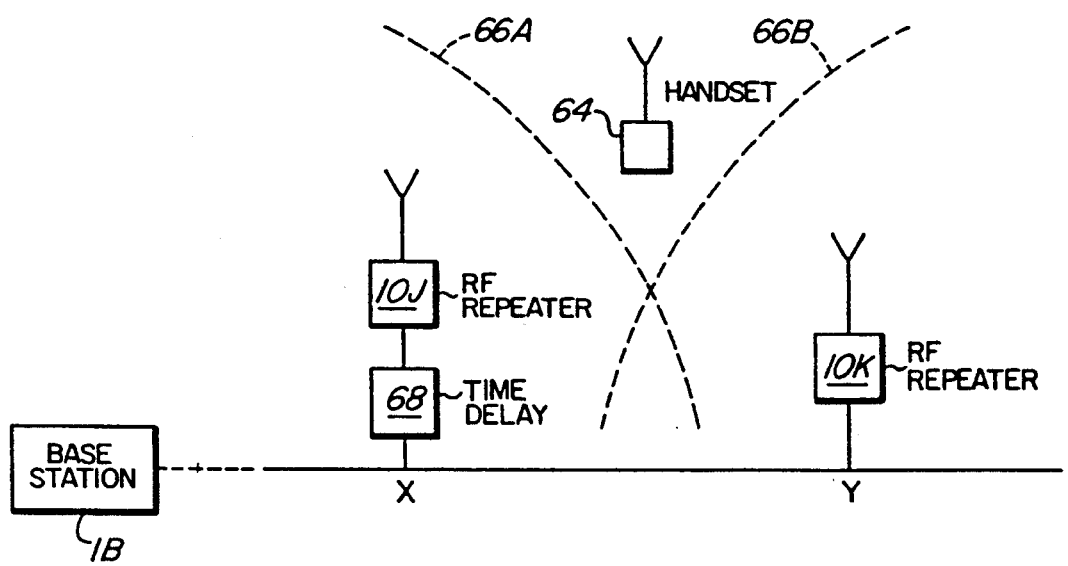

FIG. 12 diagrammatically illustrates the use of a time delay in an arrangement of two RF repeaters.

Figure 13:
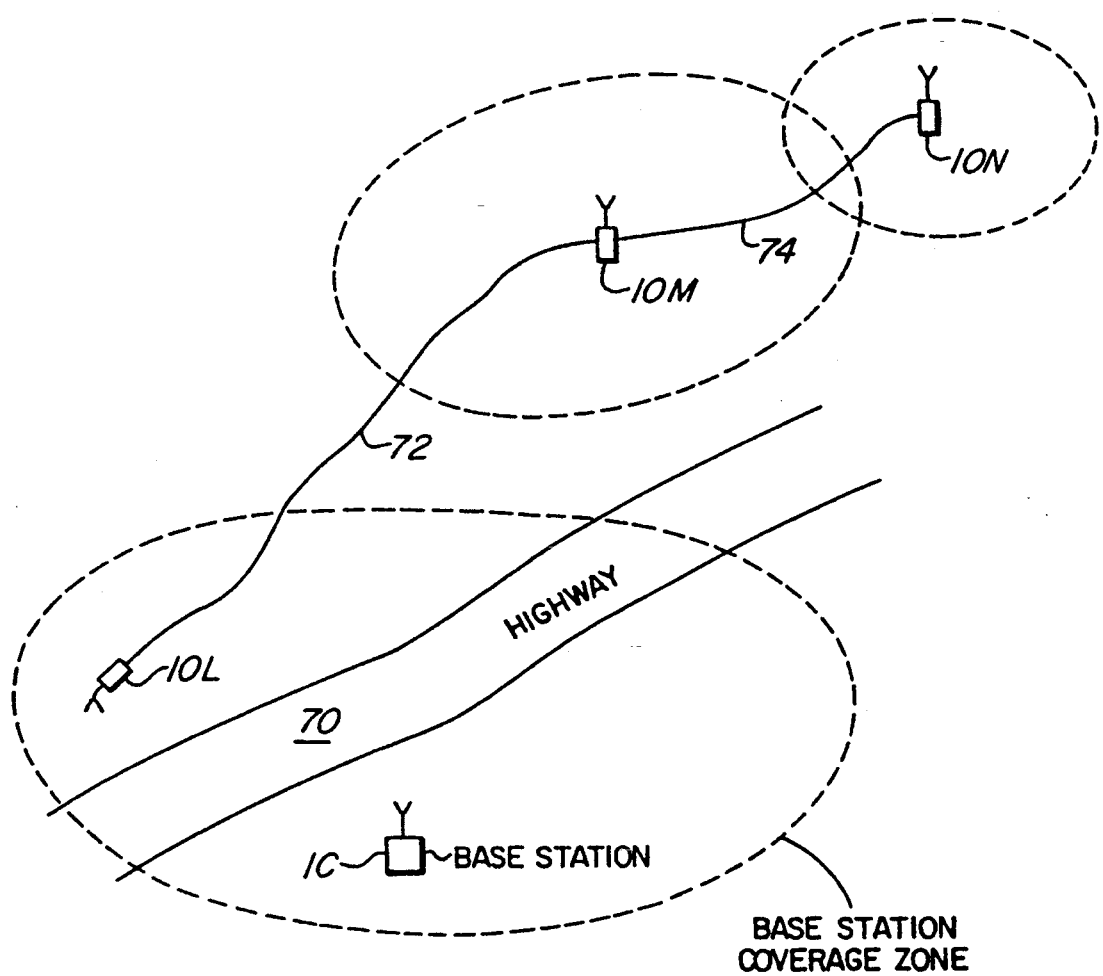

FIG. 13 shows a further possible embodiment of the present invention.

DESCRIPTION OF THE PREFERRED EMBODIMENTS

The RF repeater illustrated in FIG. 2 and indicated generally by reference numeral 10, has a first signal exchanger in the form of a coaxial cable input and output terminal 12 connected to a component 14 which is in turn connected to one terminal of a transfer switch 16. A coaxial cable (not shown) forms a signal conduit from a base station (not shown) to the cable terminal 12.

The transfer switch 16 has three other switch terminals, of which two are connected to the input and the output, respectively, of an amplifier 18, while the third is connected through a band limiting filter 20 to a second signal exchanger in the form of an antenna 22.

The transfer switch 16 has two switch states.

In the first switch state, as illustrated in broken lines in FIG. 2, the transfer switch 16 connects the component 14 to the input of the amplifier 18, and also connects the output of the amplifier 18 to the band limiting filter 20 and the antenna 22.

In its second switch state, the transfer switch 16 connects the component 14 to the output of the amplifier 18, and also connects the antenna 22, through the band limiting filter 20, to the input of the amplifier 18.

It will be apparent that, in the first switch state of the transfer switch 16, the amplifier 18 serves to amplify a downstream transmit signal passing from the coaxial cable to the antenna 22, whereas in the second switch state, the transfer switch 16 serves to amplify an incoming, upstream receive signal passing from the antenna 22 to the coaxial cable.

The component 14 is illustrated in greater detail in FIG. 3, in which a power pickup 24 is shown, which serves to supply power to the component 14.

FIG. 3 also shows a transmit/receive switching logic circuit 26 which, together with the power pickup 24, is connected through an RF choke 28 to a conductor 30.

The coaxial cable input and output terminal 12 is connected to a directional tap 32 at one end of the conductor 30, and the directional tap 32 is also connected to a coaxial cable loop through terminal 34, by which the RF repeater 10 can be connected in parallel with one or more other such RF repeaters.

The directional tap 32 is connected through a DC blocking capacitor C1 and a gain adjustment circuit 36 to the transfer switch 16.

The RF repeater of FIG. 2 may readily be simplified to serve as a terminator of the signal conduit comprising the coaxial cable (not shown) connected to the cable input and output terminal 12. For this purpose, the directional tap 32 and the loop through terminal 34 are omitted, and the cable input and output terminal 12 is connected directly to the conductor 30.

The modification of the RF repeater illustrated in FIG. 4 and indicated generally by reference numeral 10A has the component 14 replaced by a component 14A, which is connected to the transfer switch 16 and which is also connected, through an RF choke 28A and a conductor 38, to a coaxial cable loop through terminal 34A, which corresponds to the terminal 34 of FIG. 3 and which is used for connecting the RF repeater 10A in line with one or more similar RF repeaters.

A conductor 38A is connected through a directional tap 32A to a conductor 40 which interconnects the transfer switch 16 and the band limiting filter 20.

As can be seen from FIG. 5, the conductor 30 is, in this case, connected directly to the coaxial cable input and output terminal 12, and the outputs of the power pick-up 24 and the transmit/receive switching logic circuit 26 are connected at the output of the component 14A to the conductor 38.

FIG. 6 shows an arrangement of five RF repeaters 10A–10C arranged in line and connected to one another and to a coaxial cable input and output terminal 40, by coaxial cables 42A–42E, which typically may have a length of 400 feet, except for the coaxial cable 42E, which may be longer and may, for example, be 500 foot in length.

As can be seen in FIG. 6, the RF repeaters 10B–10E are similar to the RF repeater 10A. It is, however, alternately possible to replace these RF repeaters by RF repeaters such as the RF repeater 10 of FIG. 2.

In embodiment of the invention shown in FIG. 6, the RF repeaters 10A–10C and 10E are each provided with the antenna 22 for exchanging off-air signals with the handsets (not shown). However, the RF repeater 10D is arranged and employed as a time divsion duplex line amplifier, to provide gain on the coaxial cable 42E, and therefore has the handpass filter 20 connected to the coaxial cable 42E instead of to an antenna.

Also, the RF repeater 10E has no loop through terminal.

As is also apparent from FIG. 6, the coverage zones 44A–44C of the RF repeaters 10A–10C are arranged in a distributed antenna array, and overlap one another, so that the cordless handsets communicating through the RF repeaters 10A, 10B and 10C can move from one of these zones to another, without need for additional call hand-off processing.

FIG. 7 shows a modification, indicated generally by reference numeral 10F, of the RF repeater 10A of FIG. 3. The modified RF repeater 10F has an additional component 14B inserted between the output of the amplifier 18 and the transfer switch 16.

The component 14B is a power detector circuit, which is provided for determining the power of the receive signal from the antenna 22 and for squelching the RF repeater when the power falls below a predetermined value. In an alternative embodiment, which is not shown, the power detector circuit 14B may be inserted within the interstage gain elements of the amplifier 18.

As shown in FIG. 8, the power detector circuit 14B is connected to the amplifier 18 and the transfer switch 16 through a directional tap 46. A switch control 48 serves to connect the signal and noise at the tap 46, and a known noise source 50, to the input of an RF amplifier 52.

The power detector circuit 14B is shown in more detail in FIG. 8. Directional tap 46 is used to connect the power detector circuit to amplifier 18 and transfer switch 16 of FIG. 7.

The output of the RF amplifier 52 is connected to a diode detector circuit indicated generally by reference numeral 54, which rapidly samples both the band limited RF signal and noise $S_3$ from the tap 46 and the sample signal $S_3$ from the known noise source 50.

As a consequence of the switching action of the switch control 48, an AC baseband waveform, which is illustrated in FIG. 8b, is produced at point P at the output of the diode detector circuit 54.

The detector output signal has a period t which is defined by the switch control 48, and has an amplitude A, which corresponds to the level of the signal and noise passing through the tap 46 from the amplifier 18 in comparison to the level of the sample signal $S_2$ from the known noise source 50.

The period t is selected to be sufficiently large to allow the operational amplifier 52 to have gain at the switching rate and to be sufficiently small so as to not interact with the time division duplex signal rates of the transmit and receive signals.

This signal is then amplified by an operational amplifier circuit 56, which has a large AC gain at the switching frequency, and the output of which is connected to one terminal of a comparator 58.

A reference voltage $V_T$ is applied to the other input of the comparator 58, which compares the two values to provide an output signal on a comparator output 60. If the amplitude A is insufficient to exceed the threshold voltage $V_T$, the comparator output signal causes the transfer switch 16 to squelch the received signal that would otherwise be passed back over the coaxial output.

For squelch operation in a time division duplex amplifier, this arrangement presents a number of advantages:

1. Amplification of the AC baseband allows very large operational amplifier gains to be used without causing trouble with DC offsets or voltage rail limitation. Also, variations in the performance of the diode detector circuit 54 are of little consequence, since the comparator action depends on the diode performance referenced against the known noise source 50. Consequently, this arrangement is extremely sensitive and, therefore, suitable for squelch operations, that do not use complex heterodyning processing.

2. By locating the diode detector circuit 54 in the amplifier chain connected to the transfer switch 16, the diode detector circuit 54 can be used to measure power directed towards the antenna 22. This allows the possibility of employing the circuit for installation and setting up, and also automatic control, of the net amplifier gain.

3. The circuit can be used for automatic gain control of the gain in the reverse direction.

4. This arrangement utilizes low cost, simple components, particularly if coupled to microprocessor control of the comparator and switching functions. It is pointed out that the transfer switch 16 provides an easy and effective way to effect the squelching.

Since the amplifier 18 is not connected to the coaxial cable input/output terminal 12, it does not inject noise in the coaxial cable when the squelch is active.

In addition, it is pointed out that the RF repeater 10 of FIG. 2 can be modified by inclusion of the power detector circuit 14B between the amplifier 18 and the transfer switch 16 of FIG. 2.

The RF repeater 10F of FIG. 7 may be modified, as illustrated in FIG. 7A, so as to serve as a time division duplex line amplifier in the signal conduit comprising the coaxial cable (not shown) connected to the coaxial cable input and output terminal 12. For this purpose, the antenna 22 the band limiting filter 20, and the directional tap 32A of FIG. 7 are omitted, and the transfer switch 16 is connected by conductor 61 to a further coaxial cable input and output terminal 34C. A further coaxial cable (not shown) is connected, as part of the signal conduit, between the terminal 12B and a further RF repeater (not shown) which may be similar, for example, to the RF repeater 10F of FIG. 7.

FIG. 9 shows an RF repeater, indicated generally by reference numeral 10G, which is a further modification of the RF repeater 10 of FIG. 2.

More particularly the RF repeater 10G of FIG. 9 includes a power supply 24 for locally applied power and a timing control circuit 26A for generating locally the timing pulses for controlling the operation of the RF repeater. The timing control circuit 26A is connected to the signal conduit through a directional tap 32B.

Local timing is effected in this embodiment by means of control and signalling channels containing timing data.

It is, however, alternatively possible to employ local cellular, paging or TV signals to derive the timing for both the base stations and the off-air repeater.

In this embodiment, the base station, which is indicated by reference numeral 1A, communicates with the RF repeater 10E through antennas 62A and 62B having directional gain, and the RF repeater 10E in turn communicates with a further RF repeater through antennas, of which only one is shown and which is indicated by reference numeral 62C, which likewise have directional gain.

A modified arrangement of this type is illustrated in FIG. 9A, in which there is shown a further modified RF repeater 10H, with the timing control circuit 26A connected to antenna 62D. In this case, a further timing control circuit 26B is connected to the base station 1B, and provided with an antenna 62E. The antennas 62D and 62E serve to receive the local paging or cellular signals, or TV signals.

The embodiments of FIGS. 9 and 9A may usefully be employed, for example, when the off-air connection between the base station and the RF repeater is used to communicate over an intermediate area in which there is no right of way for cables or over which, for some other reason, it is not possible to employ cables, e.g. as described below with reference to FIG. 13.

The RF repeaters 10G and 10H may be modified for connection to one or more further RF repeaters as described above.

FIG. 10 shows a further embodiment of the RF repeater according to the present invention, indicated generally by reference numeral 10I, and which is similar to the RF repeater 10A of FIG. 7A except that, in the case of the RF repeater 10I, the coaxial cable input and output terminal 12 is replaced by an antenna 22A, the component 14B is replaced by the component 14C, illustrated in FIG. 11, the antenna 22 is omitted and the band limiting filter 20 is connected to the loop through terminal 34C.

Referring to FIG. 11, it will be seen that the signal conduit is connected through a directional tap 32C to a timing control circuit 26B, the output of which is connected to the transmit/receive switching logic 26.

The RF repeater 10I may serve as an off-air relay communicating with a base station, and also providing power and synchronization and communicating with further RF repeaters through the loop through terminal 34C which is connected to a dedicated coaxial cable (not shown).

FIG. 12 illustrates a handset 64 which is located in the so-called "overlap zone" between the coverage zones 66A and 66B of respective RF repeaters 10J and 10K, which are connected to a base station 1B.

In such circumstances, it is possible for phasing effects to create a "null" in the overlap region, which varies in severity according to the differences in phase noise associated with the two RF repeaters 10F and 10G. By using a dedicated signal conduit, with no heterodyne operations, this differential phase noise is made negligible, thus improving voice quality.

Also, differential timing effects affect voice quality in the overlap zone. The time division duplex timing of the RF repeater 10J is dependent on the propagation delay of the path from point X to the handset 64. However, the analogous path for the RF repeater 10K is from the point X, through the point Y to the handset 64. To counteract the effect of these different point lengths, a time delay element 68 is provided between point X and the RF repeater 10J. Without this time delay element 68, when the handset 64 is in the location in which it is shown in FIG. 12, it would be subjected to two versions of time division duplex timing, the two versions differing by an amount equivalent to the delay path XY. The magnitude of the time delay of the time delay element is selected so as to equalize the timing on the two paths.

FIG. 13 shows a further possible embodiment of the present invention, in which a base station communicates by off-air signals with an RF repeater 10L over a highway 70. This arrangement avoids any necessity for a right of way between the base station 1C and the RF repeater 10L.

The RF repeater 10L is connected to a coaxial cable 72 to a further RF repeater 10M, which in turn is connected by a coaxial cable to a still further RF repeater 10N. The RF repeaters 10L–10N are implemented as described above with reference to the preceding figures.

The length of the coaxial cable 72 is sufficient to ensure RF stability, i.e. that there is no feedback from RF repeater 10L to RF repeater 10M or from RF repeater 10N to RF repeater 10L. Thus, for example, Repeater 10L may be in a mode of receiving signals from the base station 10C while simultaneously relaying the signals and broadcasting them through RF repeaters 10M and 10N.

Because of the isolation afforded by the distance between the RF repeater 10L and the RF repeaters 10M and 10N, directive antennas are not a necessity for operational stability in this arrangement.

As will be apparent to those skilled in the art, various modifications may be made in the above described embodiments of the invention within the scope of the appended claims.

For example, while the above-described embodiments of the invention do not employ heterodyne operation, it is envisaged that such operation may be employed in implementing the present invention.

I claim:

1. An RF repeater for interfacing with a base station for exchanging transmit signals from the base station and receive signals from a cordless handset in a time division duplex cordless telephone system, said RF repeater comprising:

first signal exchange means for exchanging the transmit and receive signals with said base station;

second signal exchange means for exchanging the transmit and receive signals with said cordless handset;

a multicarrier amplifier having an input and an output;

switch means connected to said amplifier output, said amplifier input and said first and second signal exchange means and having first and second states;

said switch means connecting said second signal exchange means to said amplifier input and said amplifier output to said first signal exchange means in said first switch state;

said switch means connecting said first signal exchange means to said amplifier input and said amplifier output to said second signal exchange means in said second state;

means for controlling the operation of said switch means so that the transmit and receive signals are alternately amplified by said amplifier; and a signal detector responsive to the receive signal passing through said amplifier and controlling said switch means so as to squelch the receive signal when the receive signal power is below a predetermined value;

said signal detector comprising means for comparing the receive signal and noise from a known noise source to provide a comparison signal for controlling said switch means.

2. An RF repeater as claimed in claim 1, wherein said signal detector comprises means, respective to the receive signal and to noise from a known noise source, for providing a corresponding AC broadband waveform, operational amplifier circuitry for amplifying the AC broadband waveform and comparator means, responsive to the amplified AC broadband waveform and a reference value, for providing a control signal to said switch means.

* * * * *